United States Patent
Zhu et al.

(10) Patent No.: US 10,606,740 B2
(45) Date of Patent: Mar. 31, 2020

(54) FLEXIBLE SHADER EXPORT DESIGN IN MULTIPLE COMPUTING CORES

(71) Applicants: Advanced Micro Devices, Inc., Sunnyvale, CA (US); ATI Technologies ULC, Markham (CA)

(72) Inventors: Yunpeng Zhu, Shanghai (CN); Jimshed Mirza, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 186 days.

(21) Appl. No.: 15/607,118

(22) Filed: May 26, 2017

(65) Prior Publication Data

US 2018/0314528 A1 Nov. 1, 2018

(30) Foreign Application Priority Data

Apr. 28, 2017 (CN) .......................... 2017 1 0297286

(51) Int. Cl.
*G06F 12/02* (2006.01)
*G06F 9/38* (2018.01)
(Continued)

(52) U.S. Cl.
CPC ........ *G06F 12/0223* (2013.01); *G06F 9/3004* (2013.01); *G06F 9/3824* (2013.01);
(Continued)

(58) Field of Classification Search
CPC .... G06F 9/3851; G06F 9/3879; G06F 9/4881; G06F 12/0207; G06F 12/0223;
(Continued)

(56) References Cited

U.S. PATENT DOCUMENTS 6,108,460 A 8/2000 Rich
6,243,081 B1 6/2001 Goris et al.
(Continued)

OTHER PUBLICATIONS

European Search Report in European Application No. 17150171.1, dated Jul. 26, 2017, 4 pages.
(Continued)

*Primary Examiner* — Reginald G Bragdon
*Assistant Examiner* — Aaron D Ho
(74) *Attorney, Agent, or Firm* — Kowert Hood Munyon Rankin and Goetzel PC; Rory D. Rankin (57) ABSTRACT

Systems, apparatuses, and methods for generating flexibly addressed memory requests are disclosed. In one embodiment, a system includes a processor, control unit, and memory subsystem. The processor launches a plurality of threads on a plurality of compute units, wherein each thread generates memory requests without specifying target memory addresses. The threads executing on the plurality of compute units convey a plurality of memory requests to the control unit. The control unit generates target memory addresses for the plurality of received memory requests. In one embodiment, the memory requests are write requests, and the control unit interleaves write requests from the plurality of threads into a single output buffer stored in the memory subsystem. The control unit can be located in a cache, in a memory controller, or in another location within the system.

20 Claims, 9 Drawing Sheets

(51) Int. Cl.
*G06F 9/48* (2006.01)
*G06T 1/60* (2006.01)
*G06T 15/00* (2011.01)
*G06F 12/0811* (2016.01)
*G06F 9/30* (2018.01)
*G06F 12/084* (2016.01)

(52) U.S. Cl.
CPC .......... *G06F 9/3851* (2013.01); *G06F 9/3887* (2013.01); *G06F 9/4881* (2013.01); *G06F 12/084* (2013.01); *G06F 12/0811* (2013.01); *G06T 1/60* (2013.01); *G06T 15/005* (2013.01); *G06F 12/0207* (2013.01); *G06F 2212/1044* (2013.01); *G06F 2212/455* (2013.01)

(58) Field of Classification Search
CPC ................. G06F 12/081; G06F 12/084; G06F 2212/1044; G06F 2212/455; G06T 1/60; G06T 15/005
USPC ........................................................ 711/217
See application file for complete search history.

(56) References Cited

U.S. PATENT DOCUMENTS

| | | | |
|---|---|---|---|
| 6,452,602 B1 | 9/2002 | Morein | |
| 6,959,110 B1 | 10/2005 | Danskin et al. | |
| 7,042,462 B2* | 5/2006 | Kim | G06T 15/005 345/422 |
| 7,239,322 B2* | 7/2007 | Lefebvre | G06F 9/3851 345/522 |
| 7,719,540 B2* | 5/2010 | Piazza | G09G 5/363 345/501 |
| 8,174,534 B2* | 5/2012 | Jiao | G06T 15/04 345/426 |
| 8,295,621 B1 | 10/2012 | Diard | |
| 8,643,659 B1 | 2/2014 | Baldwin | |
| 9,819,970 B2 | 11/2017 | Sermadevi et al. | |
| 2007/0011432 A1* | 1/2007 | Tuuk | G06F 9/345 711/217 |
| 2009/0189909 A1 | 7/2009 | Jiao et al. | |
| 2012/0320067 A1 | 12/2012 | Iourcha et al. | |
| 2015/0026438 A1 | 1/2015 | Giroux et al. | |
| 2015/0070380 A1 | 3/2015 | Lum et al. | |
| 2015/0070381 A1 | 3/2015 | Lum et al. | |
| 2016/0300320 A1 | 10/2016 | Iourcha et al. | |
| 2017/0186224 A1 | 6/2017 | Diard | |
| 2017/0256024 A1 | 9/2017 | Abraham et al. | |
| 2017/0256025 A1 | 9/2017 | Abraham et al. | |
| 2017/0278215 A1 | 9/2017 | Appu et al. | |
| 2017/0287209 A1 | 10/2017 | Gierach et al. | |
| 2018/0089091 A1 | 3/2018 | Akenine-Moller et al. | |
| 2018/0182155 A1 | 6/2018 | Mirza et al. | |

OTHER PUBLICATIONS

Communication pursuant to Article 94(3) EPC in European Application No. 17150171.1, dated Jan. 15, 2018, 4 pages.
Akenine-Möller, et al., "Graphics Processing Units for Handhelds", Proceedings of the IEEE, May 2008, pp. 779-789, vol. 96, Issue 5, IEEE, New York, NY, USA.
International Search Report and Written Opinion in International Application No. PCT/US2012/042442, dated Oct. 31, 2012, 11 pages.
Woo et al., "A 195mW, 9.1 MVertices/s Fully Programmable 3-D Graphics Processor for Low-Power Mobile Devices", IEEE Journal of Solid-State Circuits, Nov. 19, 2008, pp. 2370-2380, vol. 43, No. 11, IEEE, Piscataway, NJ, USA.
Communication pursuant to Article 94(3) EPC in European Application No. 17150171.1, dated Jul. 25, 2018, 3 pages.
International Search Report and Written Opinion in International Application No. PCT/US2017/067697, dated Mar. 20, 2018, 10 pages.
Non-Final Office Action in U.S. Appl. No. 15/389,075, dated Apr. 23, 2018, 13 pages.
Final Office Action in U.S. Appl. No. 15/389,075, dated Sep. 19, 2018, 14 pages.
Non-Final Office Action in U.S. Appl. No. 15/389,075, dated Apr. 11, 2019, 16 pages.

* cited by examiner

FLEXIBLE SHADER EXPORT DESIGN IN MULTIPLE COMPUTING CORES

PRIORITY INFORMATION

This application claims benefit of priority to Chinese Application No. 201710297286.8, entitled "FLEXIBLE SHADER EXPORT DESIGN IN MULTIPLE COMPUTING CORES", filed Apr. 28, 2017, the entirety of which is incorporated herein by reference in its entirety.

BACKGROUND

Description of the Related Art

A graphics processing unit (GPU) is a complex integrated circuit that is configured to perform graphics-processing tasks. For example, a GPU can execute graphics-processing tasks required by an end-user application, such as a video-game application. The GPU can be a discrete device or can be included in the same device as another processor, such as a central processing unit (CPU). GPUs can also be used for general purpose computing tasks. For example, a GPU can perform computations in applications which are traditionally handled by a central processing unit (CPU). These applications can include scientific computing applications which involve calculations using matrices or vectors. Other applications can also exploit the parallel processing capabilities of GPUs.

When used in graphics applications, a GPU produces the pixels that make up an image from a higher level description of its components in a process known as rendering. GPUs typically utilize a concept of continuous rendering by the use of computing elements to process pixel, texture, and geometric data. The computing elements can execute the functions of rasterizers, setup engines, color blenders, hidden surface removal, texture mapping, etc. These computing elements are often referred to as shaders, shader processors, shader arrays, shader units, shader engines, etc., with "shader" being a term in computer graphics referring to a set of software instructions or a program used by a graphics resource to perform rendering effects. "Shader" can also refer to an actual hardware component or processor used to execute software instructions. A shader processor or program can read and render data and perform any type of processing of the data.

A portion of the processing involved in generating complex graphics scenes involves rasterizing primitives. Rasterization is performed to determine which portions of the primitives are visible in the screen image pixels. Given a primitive's vertices, a rasterization process figures out which pixels to turn on to render the primitive. Also, at each pixel, the rasterization process keeps track of the closest primitive (using the z-buffer) and overwrites the pixel only if the primitive being drawn is closer than the previous primitive in that pixel. However, the process of rasterizing primitives can be complex and inefficient. For example, small primitives are not rasterized efficiently in traditional graphics pipelines. If the pixels of the primitives have the same coordinates, the pixel data will overwrite the same memory locations. Also, if the pixel data is localized in a small region, much of the memory buffer space will be wasted.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for generating flexibly addressed memory requests are disclosed herein. In one embodiment, a system includes a processor, control unit, and memory subsystem. The processor launches a plurality of threads on the plurality of compute units, wherein each thread generates memory requests without specifying target memory addresses. The threads executing on the plurality of compute units convey a plurality of memory requests to the control unit. The control unit generates target memory addresses for the plurality of received memory requests. In one embodiment, the memory requests are write requests, and the control unit interleaves write requests from the plurality of threads into a single output buffer stored in the memory. The control unit can be located in a cache, in a memory controller, or in another location within the system.

Figure 1:
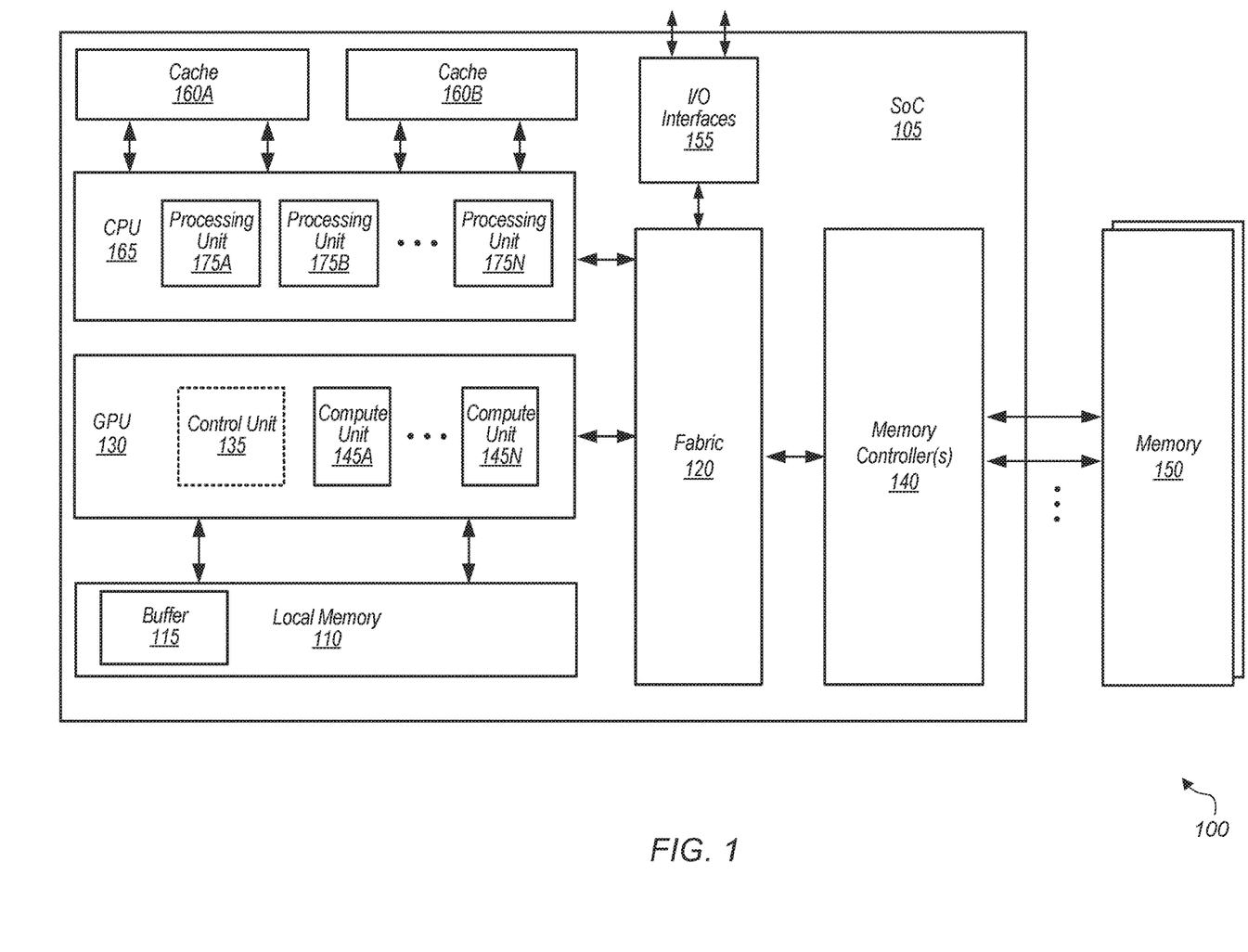
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 175A-N of central processing unit (CPU) 165, input/output (I/O) interfaces 155, caches 160A-B, fabric 120, graphics processing unit (GPU) 130, local memory 110, and memory controller(s) 140. SoC 105 can also include other components not shown in FIG. 1 to avoid obscuring the figure. Processing units 175A-N are representative of any number and type of processing units. In one embodiment, processing units 175A-N are CPU cores. In another embodiment, one or more of processing units 175A-N are other types of processing units (e.g., application specific integrated circuit (ASIC), field programmable gate array (FPGA), digital signal processor (DSP)). Processing units 175A-N of CPU 165 are coupled to caches 160A-B and fabric 120.

In one embodiment, processing units 175A-N are configured to execute instructions of a particular instruction set architecture (ISA). Each processing unit 175A-N includes one or more execution units, cache memories, schedulers, branch prediction circuits, and so forth. In one embodiment, the processing units 175A-N are configured to execute the main control software of system 100, such as an operating system. Generally, software executed by processing units 175A-N during use can control the other components of system 100 to realize the desired functionality of system 100. Processing units 175A-N can also execute other software, such as application programs.

GPU 130 includes at least control unit 135 and compute units 145A-N. It is noted that control unit 135 can also be located in other locations (e.g., fabric 120, memory controller 140). Control unit 135 includes logic for generating target memory addresses for received write requests which do not include specified target memory addresses. In one embodiment, the memory addresses generated by control unit 135 target buffer 115 in local memory 110. In other embodiments, the memory addresses generated by control unit 135 can target buffers in other locations (e.g., memory 150). Compute units 145A-N are representative of any number and type of compute units that are used for graphics or general-purpose processing. Each compute unit 145A-N includes any number of execution units, with the number of execution units per compute unit varying from embodiment to embodiment. GPU 130 is coupled to local memory 110 and fabric 120. In one embodiment, local memory 110 is implemented using high-bandwidth memory (HBM). The combination of local memory 110 and memory 150 can be referred to herein as a "memory subsystem". Alternatively, either local memory 110 or memory 150 can be referred to herein as a "memory subsystem".

In one embodiment, GPU 130 is configured to execute graphics pipeline operations such as draw commands, pixel operations, geometric computations, rasterization operations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 is configured to launch a plurality of threads on the plurality of compute units 145A-N, wherein each thread generates memory requests without specifying target memory addresses. The plurality of compute units 145A-N convey a plurality of memory requests to control unit 135. Control unit 135 generates target memory addresses for the plurality of received memory requests. In one embodiment, the memory requests are write requests, and control unit 135 interleaves write requests from the plurality of threads into buffer 115 stored in local memory 110.

I/O interfaces 155 are coupled to fabric 120, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 155. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 175A-N and/or compute units 145A-N. In some embodiments, SoC 105 includes caches 160A-B that are utilized by processing units 175A-N. In one embodiment, caches 160A-B are part of a cache subsystem including a cache controller.

It is noted that the letter "N" when displayed herein next to various structures is meant to generically indicate any number of elements for that structure (e.g., any number of processing units 175A-N in CPU 165, including one processing unit). Additionally, different references within FIG. 1 that use the letter "N" (e.g., compute units 145A-N) are not intended to indicate that equal numbers of the different elements are provided (e.g., the number of processing units 175A-N in CPU 165 can differ from the number of compute units 145A-N of GPU 130).

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
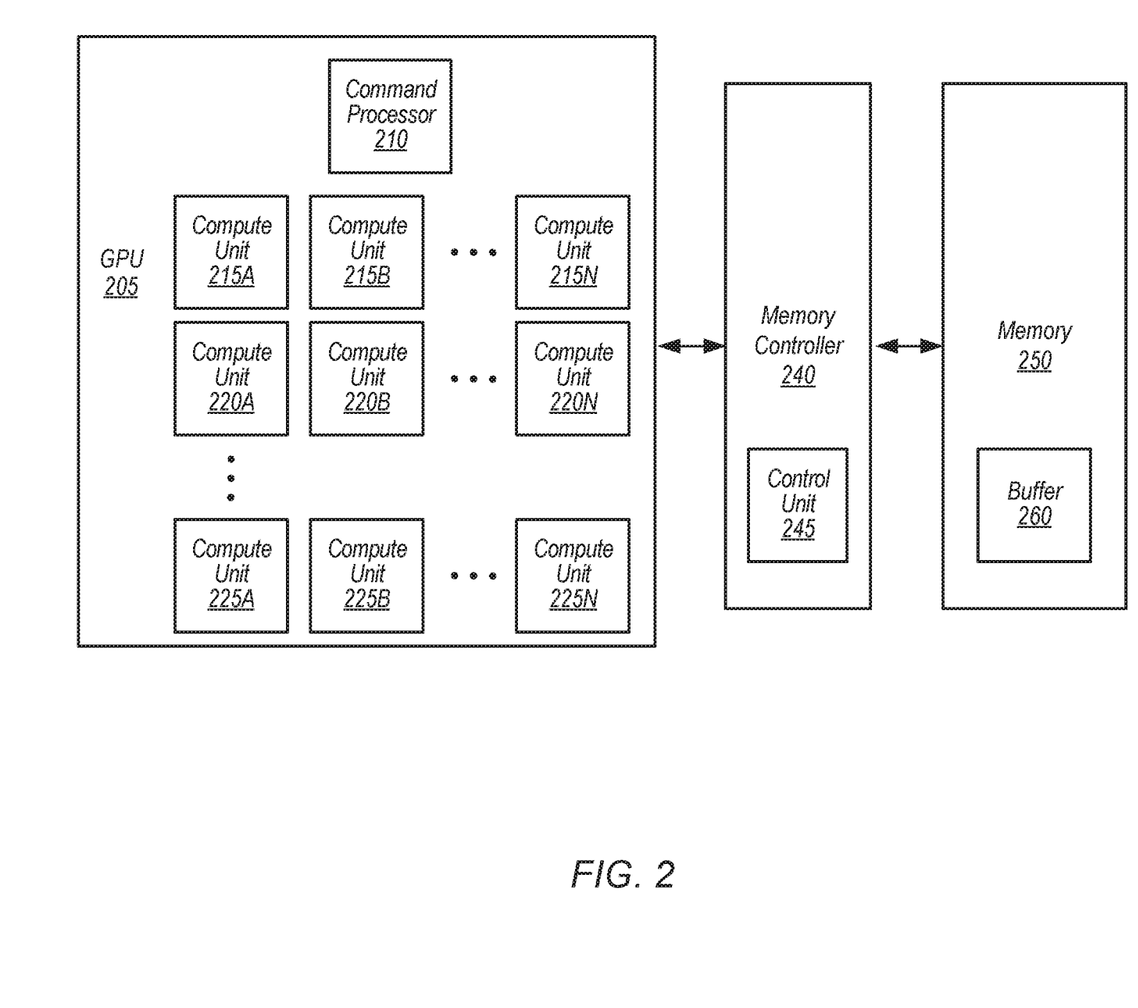
FIG. 2 is a block diagram of one embodiment of a graphics processing unit (GPU).

Turning now to FIG. 2, a block diagram of one embodiment of a graphics processing unit (GPU) 205 is shown. GPU 205 includes at least command processor 210 and compute units 215A-N, 220A-N, and 225A-N. Compute units 215A-N, 220A-N, and 225A-N are representative of any number of compute units which are included within GPU 205. Depending on the embodiment, each compute unit can execute one thread, two threads, four threads, or other number of threads.

In one embodiment, command processor 210 is configured to issue threads for execution to the various compute units 215A-N, 220A-N, and 225A-N. Each compute unit 215A-N, 220A-N, and 225A-N is configured to execute flexibly-addressed memory requests that do not specify memory requests. In one embodiment, the memory requests specify a buffer identifier (ID). In one embodiment, the memory requests are conveyed to memory controller 240 on the path to memory 250. When memory controller 240 receives a memory request without an address, control unit 245 is configured to generate an address for the memory request. In one embodiment, control unit 245 accesses a base address for the buffer ID specified by the memory request. Then, control unit 245 determines an offset to apply to the base address.

In one embodiment, multiple different compute units 215A-N, 220A-N, and 225A-N generate memory requests that target the same buffer ID. Control unit 245 is configured to receive the multiple memory requests from different compute units 215A-N, 220A-N, and 225A-N and coordinate access to the single buffer specified by the buffer ID. In one embodiment, for write requests targeting the single buffer 260, control unit 245 is configured to generate a linearly incrementing address for consecutive write requests regardless of the compute unit which generated the request. After control unit 245 generates a given address for a given write request, the given write request is conveyed to memory 250 and performed to the given address of buffer 260.

Figure 3:
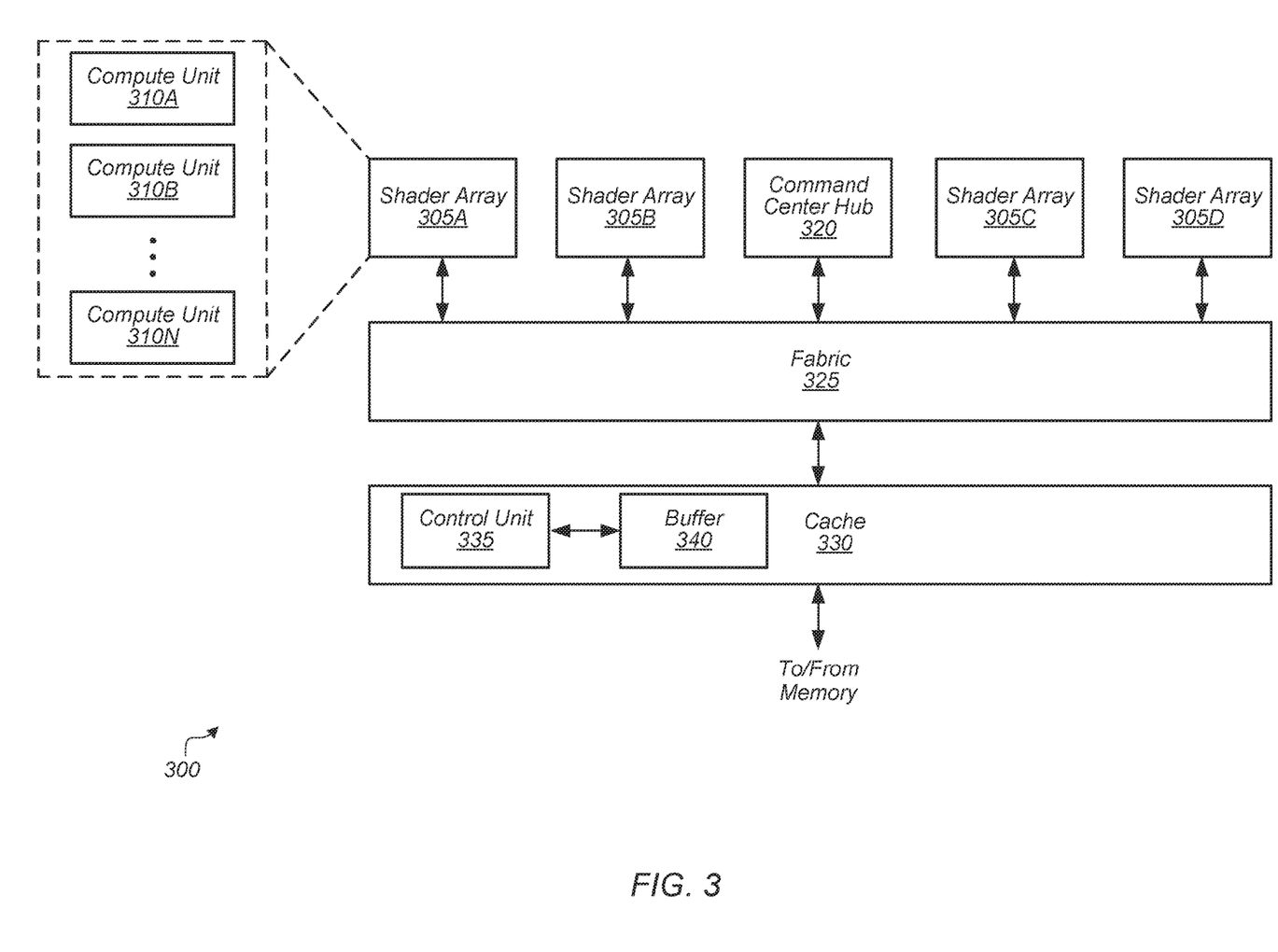
FIG. 3 is a block diagram of another embodiment of a GPU.

Referring now to FIG. 3, a block diagram of one embodiment of a graphics processing unit (GPU) 300 is shown. In one embodiment, the logic of GPU 300 is included in GPU 130 (of FIG. 1). In one embodiment, GPU 300 includes at least shader arrays 305A-D, command center hub 320, fabric 325, and cache 330. It is noted that GPU 300 also includes other logic and/or other components which are not shown in FIG. 3 to avoid obscuring the figure. It is also noted that the structure of GPU 300 is merely one example of a structure which is used in one embodiment. In other embodiments, GPU 300 can be organized in other manners.

Shader arrays 305A-D are representative of any number and type of shader compute resources which are included in GPU 300. Shader arrays 305A-D can also be referred to as "shader units". Each shader array 305A-D includes a plurality of compute units which include various compute resources for performing geometry, vertex, pixel, and/or other shading operations to render graphics. In various embodiments, the compute resources include components for fetching and decoding instructions, one or more arithmetic logic units "ALUs" for performing arithmetic calculations, and other resources. Although not shown in FIG. 3, each shader array 305A-D can include a level one (L1) cache.

One example of a shader array is shown by the expanded version of shader array 305A. As shown in the expansion of shader array 305A, shader array 305A includes compute units 310A-N. Compute units 310A-N are representative of any number of compute units, with the number of compute units varying from embodiment to embodiment. The other shader arrays 305B-D can also include a plurality of compute units as is shown for shader array 305. Shader arrays 305A-D are coupled to cache 330 via fabric 325. In one embodiment, cache 330 is a level two (L2) cache. Depending on the embodiment, cache 330 is coupled to a memory (not shown) or another level of cache (not shown). Command center hub 320 is representative of any number and type of command processors, schedulers, and other command processing resources.

In one embodiment, control unit 335 is located within cache 330. In another embodiment, control unit 335 is located within fabric 325. In one embodiment, control unit 335 is configured to receive write requests generated by the compute units of shader arrays 305A-D, wherein the write requests do not specify an address. Control unit 335 generates explicit addresses for these write requests, with the generated addresses targeting locations in buffer 340. In one embodiment, control unit 335 generates linearly increasing memory addresses for the write requests which are received from the multiple shader arrays 305A-D.

Figure 4:
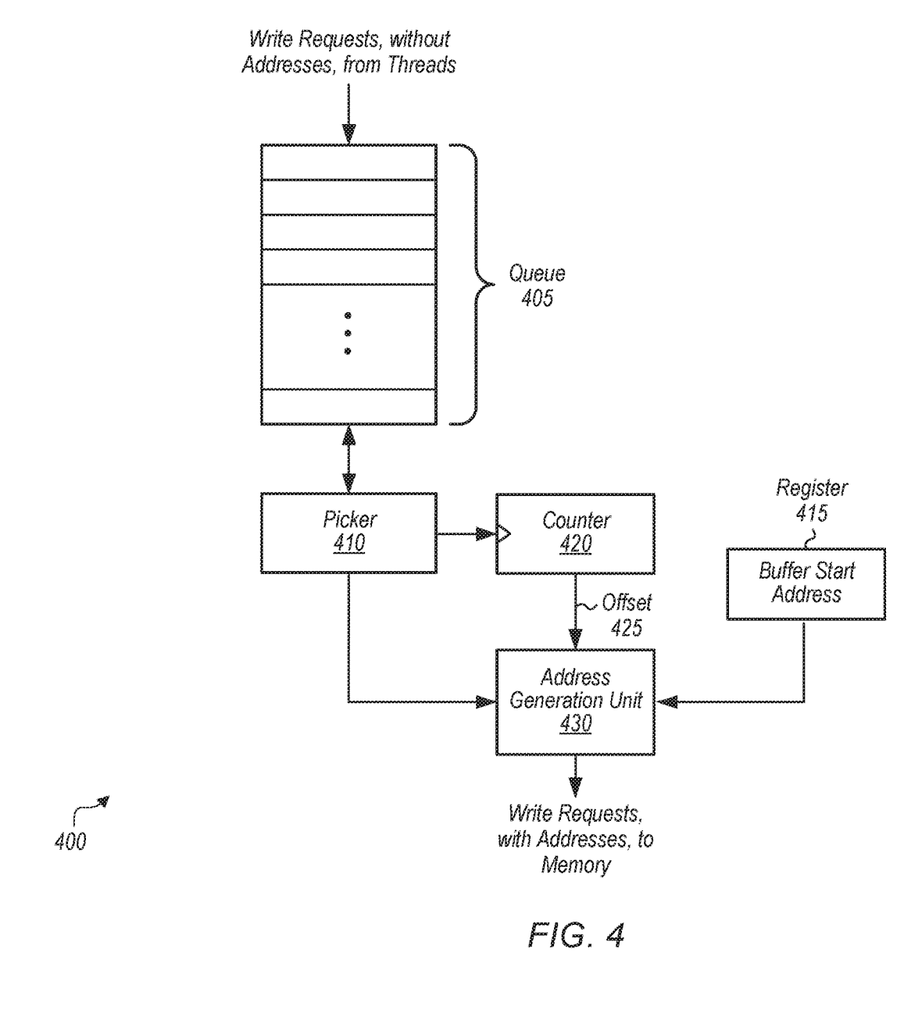
FIG. 4 is a block diagram of one embodiment of a hardware control unit.

Turning now to FIG. 4, a block diagram of one embodiment of a hardware control unit 400 is shown. In various embodiments, the logic of hardware control unit 400 can be included within control unit 135 (of FIG. 1), control unit 245 (of FIG. 2), and/or control unit 335 (of FIG. 3). Hardware control unit 400 includes queue 405, picker 410, register 415, counter 420, and address generation unit 430. Queue 405 stores incoming memory requests generated by a plurality of threads. The memory requests which are generated by the plurality of threads do not specify target memory addresses. Queue 405 is representative of any number and type of queue or buffer for storing incoming memory requests. While a single queue 405 is shown in FIG. 4, in other embodiments, hardware control unit 400 can include multiple queues for storing incoming memory requests. In one embodiment, queue 405 is a first-in, first-out queue. In other embodiments, queue 405 can be other types of queues.

Picker 410 is configured to select a request within the entries of queue 405 for conveying to address generation unit 430. In one embodiment, picker 410 selects the oldest request in queue 405. In one embodiment, address generation unit 430 is configured to retrieve the value from register 415. In one embodiment, register 415 stores a buffer start address. In one embodiment, register 415 is programmable by software. The buffer start address stored in register 415 indicates the first address of the buffer where the data of the incoming write requests will be stored in memory. In one embodiment, address generation unit 430 is configured to add the offset 425 generated by counter 420 to the buffer start address retrieved from register 415. The sum of offset 425 and the buffer start address is used to generate an address to apply to the next write request. After a write request is sent to memory (not shown), counter 420 increments offset 425 which is applied to the buffer start address to generate the next address for storing the subsequent write request. It should be understood that the logic of hardware control unit 400 is indicative of one embodiment. In other embodiments, other arrangements of logic and/or other components can be included within hardware control unit 400.

Figure 5:
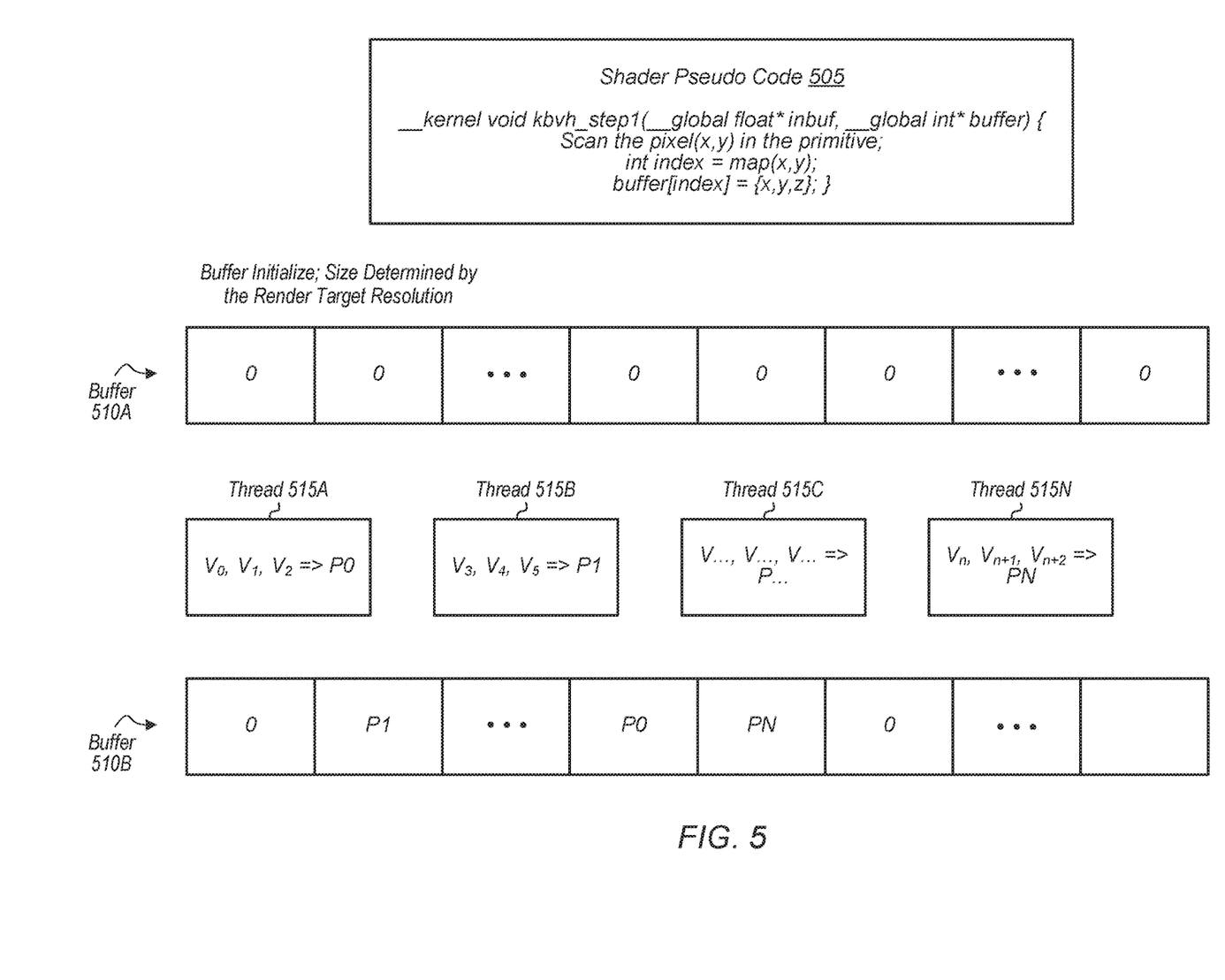
FIG. 5 is a diagram of one embodiment of a prior art approach for rasterizing primitives.

Referring now to FIG. 5, a diagram of one embodiment of a prior art approach for rasterizing primitives is shown. Shader pseudo code 505 is shown at the top of FIG. 5 as one example of shader code which can be utilized to rasterize primitives. Shader pseudo code 505 shows an example of code for rasterizing small primitives (e.g., pixel-sized triangles) using a GPU. Code 505 computes the lit pixels of the primitive and then stores color values and coordinates of these lit pixels in a buffer. The buffer address offset is derived according to the pixel coordinates (x,y).

Before executing shader pseudo code 505, buffer 510A is initialized, with the size of buffer 510A determined by the render target resolution. Then, a plurality of threads 515A-N are launched to rasterize primitives, with each thread rasterizing a different primitive. Threads 515A-N are representative of any number of threads which are launched. Accordingly, it should be understood that while four threads 515A-N are shown in FIG. 5, this is merely for illustrative purposes and any number of threads (other than four) can be launched in a given embodiment.

Then, the coordinates of rasterized pixels generated by the different threads 515A-N are written to buffer 510B. Buffer 510B is intended to represent buffer 510A at a later point in time, after the threads 515A-N have written the rasterized pixel data to buffer 510B. As can be seen in buffer 510B, the rasterized pixel data is not packed efficiently in buffer 510B. Rather, there are several gaps of unused memory locations in buffer 510B based on the unknown number of rasterized pixels created by each thread 515A-N.

Figure 6:
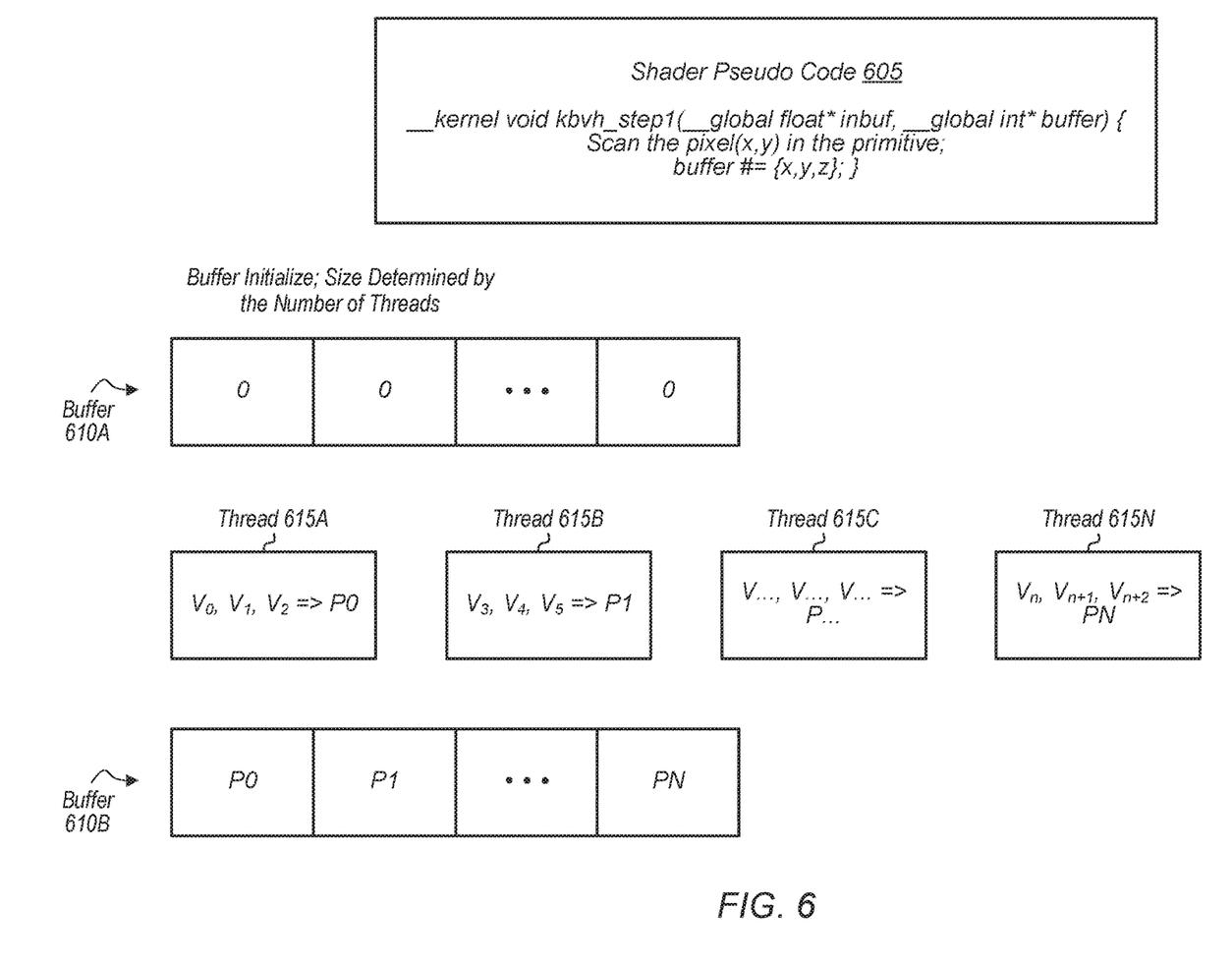
FIG. 6 is a diagram of one embodiment of an implementation of shader pseudo code.

Turning now to FIG. 6, a diagram of another embodiment of an implementation of shader pseudo code 605 is shown. Shader pseudo code 605 includes an example of code for rasterizing a plurality of primitives. The shader input is the vertex buffer, which stores (x,y,z) coordinates for each vertex of the primitive. In one embodiment, the (x,y,z) coordinates are stored in single-precision floating-point format. In one embodiment, the shader uses a rasterization algorithm to determine which pixels should be lit. Then, the shader exports the lit pixels to the output buffer without specifying the addresses of where the lit pixels should be written. In one embodiment, each pixel includes a pointer to the location of the original primitive in the vertex buffer and a one-bit indicator. The indicator specifies whether the pixel is the last pixel of the primitive. In other embodiments, other formats for storing the pixel data are possible and are contemplated.

In one embodiment, the shader pseudo code 605 includes a new identifier "#=" to allow for arbitrary export. It is noted that the new identifier "#=" can also be referred to as an "operator". For example, a new operator such as "#=" may be used in a high level shader language to differentiate from the traditional operator "=". In other embodiments, other operators or instructions can be used in a programming language to specify arbitrary export. In this example, the new operator "#=" is translated by a compiler to a new instruction (or instructions) for implementing the arbitrary exporting/movement/copying of data without specifying a target address. The instruction set architecture (ISA) will include support for the new instruction(s) either via new instructions in the ISA or existing ISA instructions, with the new instruction enabling the arbitrary export of data to an output buffer. In some embodiments, if the compiler detects that a section of code would benefit from the arbitrary export of data, the compiler will translate the traditional export operator "=" into the new instruction for implementing the arbitrary exporting of data (i.e., exporting data without specifying a target address). In these embodiments, the compiler will discard or ignore the address specified in the high level language for a traditional memory request, and the compiler will translate the traditional memory request into a binary opcode which implements a memory request without specifying the target address.

Buffer 610A is initialized prior to shader pseudo code 605 being executed. In one embodiment, the size of buffer 610A is determined by the number of threads. Then, a plurality of threads 615A-N are launched for rasterizing a plurality of primitives. The number of threads 615A-N which are launched can vary from embodiment to embodiment. The coordinates of rasterized pixels produced by the threads 615A-N are conveyed to a hardware control unit (e.g., control unit 135 of FIG. 1) without specifying target memory addresses. The hardware control unit generates memory addresses for the write requests generated by threads 615A-N. Buffer 610B is intended to represent buffer 610A at a later point in time after the pixel data has been exported. The pixel data from the write requests is written to consecutive addresses in buffer 610B, allowing buffer 610B to be used in an efficient manner. In one embodiment, the hardware control unit generates linearly increasing memory addresses for write requests in the order in which the write requests are received from threads 615A-N.

Figure 7:
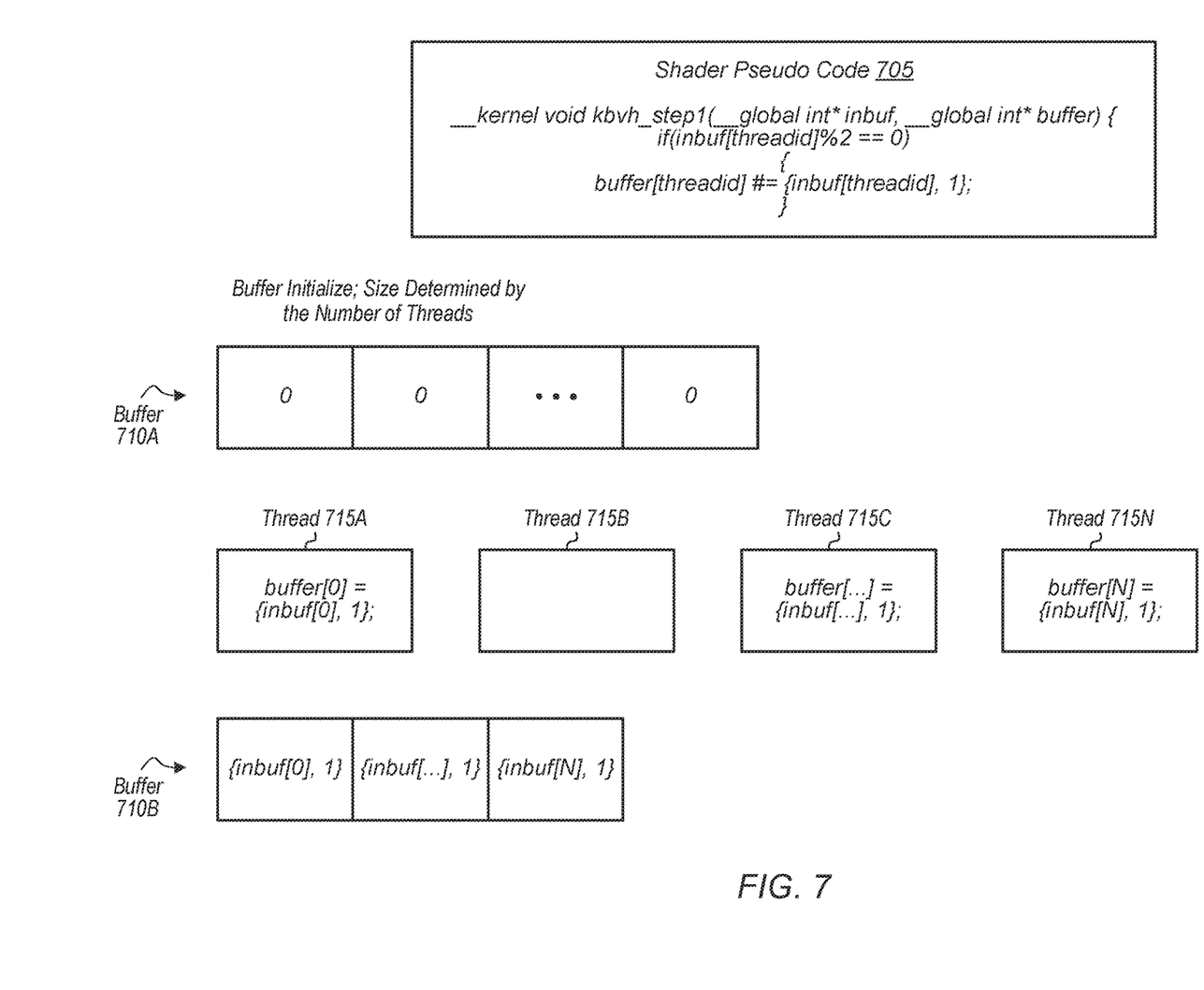
FIG. 7 is a diagram of another embodiment of an implementation of shader pseudo code.

Referring now to FIG. 7, another embodiment of pseudo shader code 705 is shown. In one embodiment, pseudo shader code 705 is executed to export valid data to a linear buffer 710A. Buffer 710A is initialized and the size of buffer 710A is determined by the number of threads. Pseudo shader code 705 is one example of code that is executed to export valid data to a linear buffer, which is widely used in many applications. The shader can perform various calculations on the input data and then the shader writes valid results to the output buffer. In this example, only thread 715B does not have valid data while the other threads 715A and 715C-N have valid data. Pseudo shader code 705 uses the new identifier "#=" to specify an arbitrary export location for the data without specifying the write address.

After pseudo shader code 705 is executed, the compute units (e.g., compute units 145A-N of FIG. 1) do not calculate the memory address for each thread 715A-N. Rather, the compute units send each thread's write request with the buffer ID, without specifying a memory address, to a hardware control unit. Based on the buffer ID, the hardware control unit is able to determine the memory starting address of the specified buffer. Then, the hardware control unit derives the memory address offset for each request, and then the memory address offset is added to the memory starting address to calculate the final target memory address. The hardware control unit supplies the final target memory address to the memory interface module. As a result, the output buffer 710B has all of the valid data packed together without any intervening gaps. Buffer 710B is intended to represent buffer 710A after the data generated by threads 715A-N has been written to buffer 710B.

Figure 8:
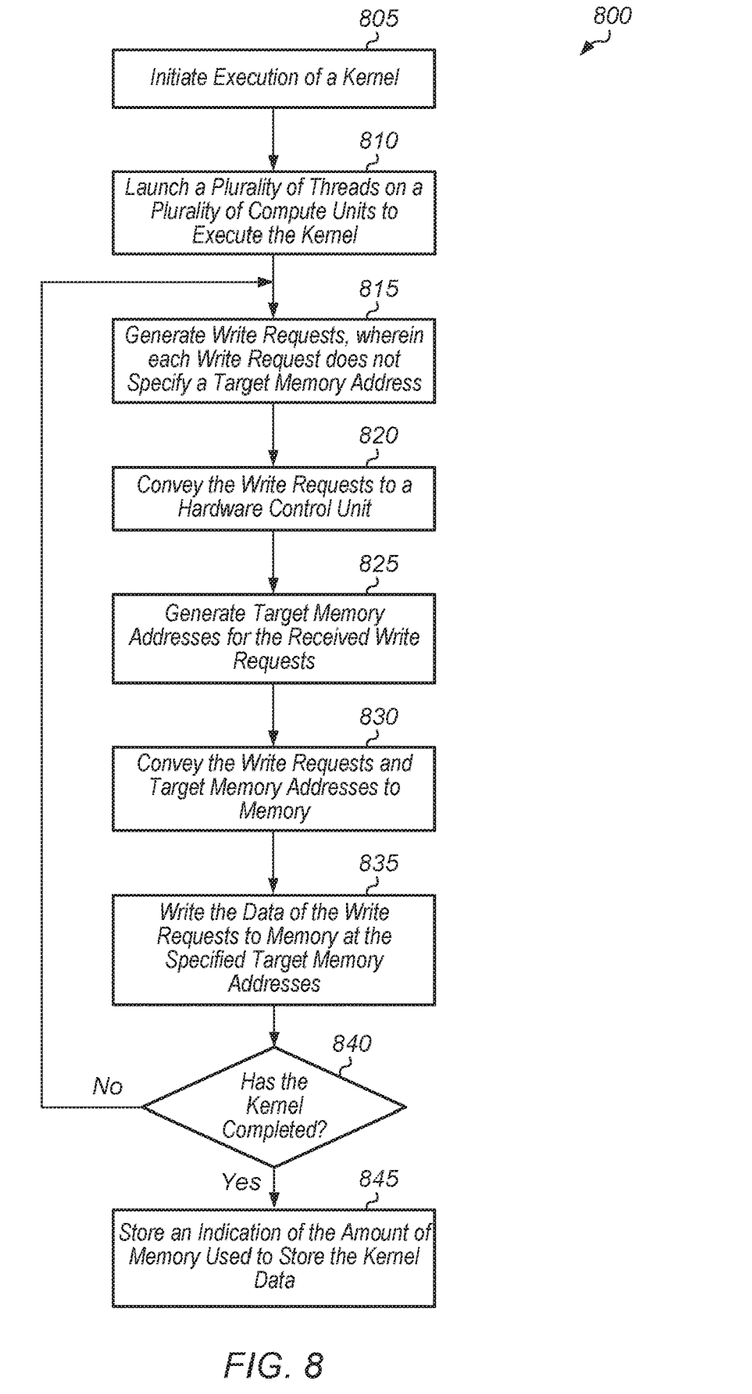
FIG. 8 is a generalized flow diagram illustrating one embodiment of a method for flexibly exporting data in shader code.
Figure 9:
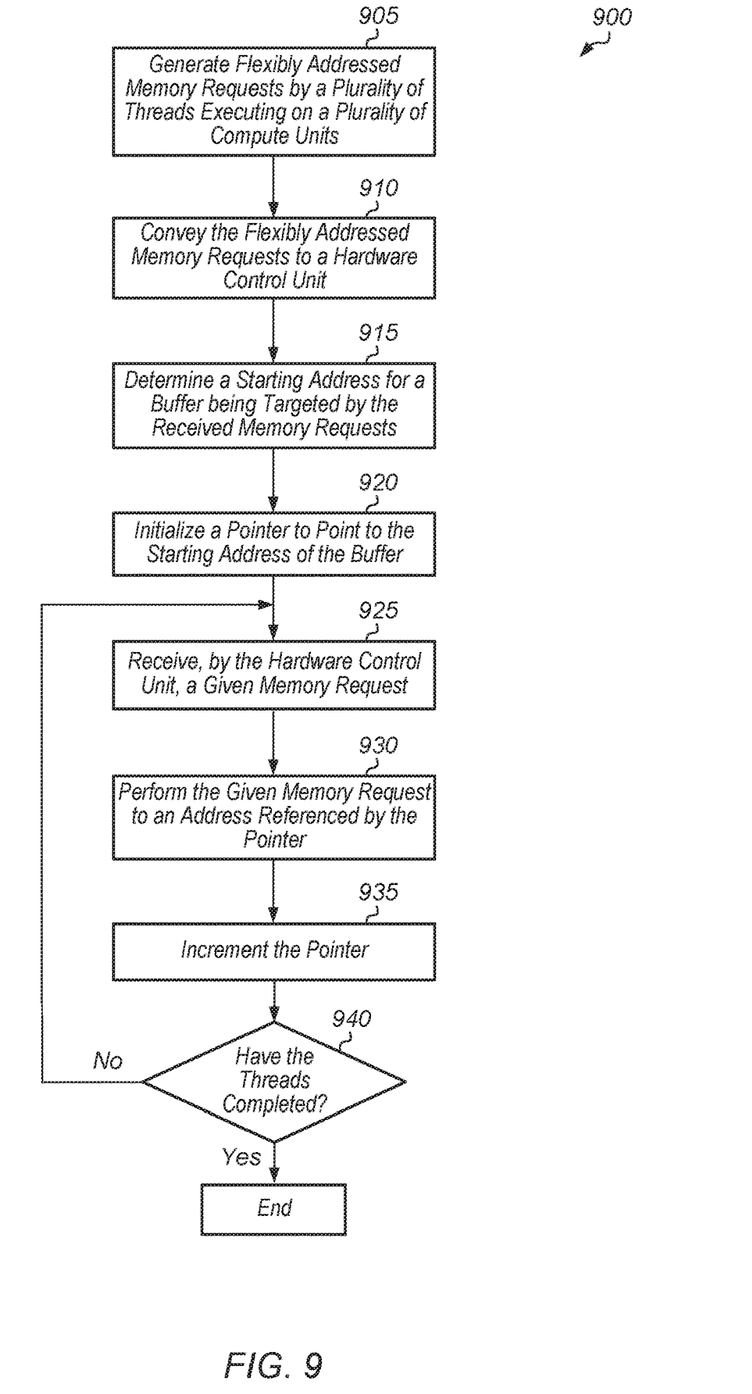
FIG. 9 is a generalized flow diagram illustrating one embodiment of a method for generating addresses for flexibly addressed memory requests.

Turning now to FIG. 8, one embodiment of a method 800 for flexibly exporting data in shader code is shown. For purposes of discussion, the steps in this embodiment and those of FIG. 9 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 800.

A computing system (e.g., system 100 of FIG. 1) initiates execution of a kernel (block 805). In one embodiment, the computing system initiates the execution of the kernel on a GPU. In other embodiments, the kernel is executed on any of various other types of processors (e.g., FPGA, ASIC, DSP). The computing system launches a plurality of threads on a plurality of compute units to execute the kernel (block 810). As used herein, a kernel is defined as a function which is launched and executed by a plurality of threads. In one embodiment, each thread executes the kernel using a unique thread identifier (ID). In one embodiment, each thread is launched on a separate compute unit. As used herein, the term "thread" is defined as a sequence of programmed instructions that are managed independently by a scheduler. Also, the term "thread" is defined as an execution context which includes the information a processing unit needs to execute a stream of instructions. The execution context consists of the values of the processing unit's registers.

Next, the threads generate write requests, wherein each write request does not specify a target memory address (block 815). Then, the write requests without specified target memory addresses are conveyed to a hardware control unit (block 820). In one embodiment, the hardware control unit is located in a cache. In another embodiment, the hardware control unit is located in a memory controller. In other embodiments, the hardware control unit can reside in other locations.

The hardware control unit generates target memory addresses for the received write requests (block 825). In one embodiment, the hardware control unit increments the generated target memory address for every received write request. In other embodiments, the hardware control unit can utilize other techniques for generating the target memory address for received write requests. Then, the hardware control unit conveys the write requests and the target memory addresses to memory (block 830). Next, the data of the write requests is written to memory at the specified target memory addresses (block 835). If execution of the kernel has completed (conditional block 840, "yes" leg), then the hardware control unit stores an indication of the amount of memory used to store the kernel data (block 845). It is noted that the amount of memory used to store the kernel data can also be referred to as the "final buffer size". The final buffer size can be communicated to a driver or to the application which can potentially benefit the read operations performed in the next phase. After block 845, method 800 ends. If the kernel has not completed (conditional block 840, "no" leg), then method 800 returns to block 815.

Referring now to FIG. 9, one embodiment of a method 900 for generating addresses for flexibly addressed memory requests is shown. A plurality of threads executing on a plurality of compute units generate flexibly addressed memory requests (block 905). The memory requests can include write requests or read requests. In one embodiment, the memory requests include write requests for threads rasterizing a plurality of primitives. In another embodiment, the memory requests include read requests reading the buffer of pixel data generated by the rasterization threads. In other embodiments, the memory requests can include other types of write and/or read requests generated for other types of scenarios. Next, the flexibly addressed memory requests are conveyed to a hardware control unit (block 910). Depending on the embodiment, the hardware control unit can be located in a cache, in a memory controller, or in other locations within a computing system. Examples of hardware control units are shown in FIGS. 1-4.

The hardware control unit is configured to determine a starting address for a buffer which is being targeted by the received memory requests (block 915). In one embodiment, the hardware control unit retrieves the buffer starting address from a programmable register. Then, the hardware control unit initializes a pointer to point to the starting address of the buffer (block 920). Next, the hardware control unit receives a given memory request (block 925). Then, the hardware control unit performs the given memory request to an address referenced by the pointer (block 930). In one embodiment, the hardware control unit writes data of a write request to a cache/memory location addressed by the pointer. In another embodiment, the hardware control unit reads data from a cache/memory location addressed by the pointer. Next, the hardware control unit increments the pointer (block 935). If the threads have completed (conditional block 935, "yes" leg), then method 900 ends. If the threads have not completed (conditional block 935, "no" leg), then method 900 returns to block 925.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
 a processor comprising a plurality of compute units;
 a control unit; and
 a memory subsystem;
 wherein the processor is configured to:
  launch a plurality of threads on the plurality of compute units, wherein each thread generates memory write requests targeting a memory location in the memory subsystem, each write request specifying a buffer identifier without specifying a target memory address;
  convey the memory write requests to the control unit;
 wherein the control unit is configured to:
  receive the memory write requests which do not specify target memory addresses;
  determine a memory starting address that corresponds to the buffer identifier; and
  generate target memory addresses for the memory write requests based at least in part on the memory starting address, wherein the target memory addresses reference locations in the memory subsystem.

2. The system as recited in claim 1, wherein the control unit is configured to increment a target memory address after generating the target memory address for a given memory request.

3. The system as recited in claim 1, wherein the control unit is located in a memory controller.

4. The system as recited in claim 1, wherein the control unit is located in a cache.

5. The system as recited in claim 1, wherein each write request comprises coordinates of one or more rasterized pixels.

6. The system as recited in claim 5, wherein the control unit is configured to interleave write requests from the plurality of threads into a single output buffer stored in the memory subsystem.

7. The system as recited in claim 1, wherein the control unit is configured to store an indication of a size of a single output buffer utilized by the write requests when the plurality of threads have completed execution.

8. A method comprising:
 launching a plurality of threads on a plurality of compute units, wherein each thread generates memory write requests targeting a memory location in a memory subsystem, each write request specifying a buffer identifier without specifying target memory addresses;
 conveying memory write requests to a control unit;
 receiving, at the control unit, the plurality of memory write requests which do not specify a target memory address; and
 determining, by the control unit, a memory starting address that corresponds to the buffer identifier; and
 generating, by the control unit, target memory addresses for the plurality of memory write requests based at least in part on the memory starting address.

9. The method as recited in claim 8, further comprising incrementing, by the control unit, a target memory address after generating the target memory address for a given memory request.

10. The method as recited in claim 8, wherein the control unit is located in a memory controller.

11. The method as recited in claim 8, wherein the control unit is located in a cache.

12. The method as recited in claim 8, wherein the plurality of memory requests are write requests, wherein each write request comprises coordinates of one or more rasterized pixels.

13. The method as recited in claim 12, further comprising interleaving write requests from the plurality of threads into a single output buffer stored in the memory subsystem.

14. The method as recited in claim 8, further comprising storing an indication of a size of a single output buffer utilized by the write requests when the plurality of threads have completed execution.

15. An apparatus comprising:
a control unit; and
a memory subsystem;
wherein the control unit is configured to:
receive memory write requests targeting a memory location in a memory subsystem, each write request specifying a buffer identifier without including a target memory address; and
determine a memory starting address that corresponds to the buffer identifier; and
generate target memory addresses for the memory write requests based at least in part on the memory starting address, wherein the target memory addresses reference locations in the memory subsystem.

16. The apparatus as recited in claim 15, wherein the control unit is configured to increment a target memory address after generating the target memory address for a given memory request.

17. The apparatus as recited in claim 15, wherein the control unit is located in a memory controller.

18. The apparatus as recited in claim 15, wherein the control unit is located in a cache.

19. The apparatus as recited in claim 15, wherein the plurality of memory requests are write requests, wherein each write request comprises coordinates of one or more rasterized pixels.

20. The apparatus as recited in claim 19, wherein the control unit is configured to interleave write requests from the plurality of threads into a single output buffer stored in the memory subsystem.

* * * * *

UNITED STATES PATENT AND TRADEMARK OFFICE
CERTIFICATE OF CORRECTION

PATENT NO. : 10,606,740 B2
APPLICATION NO. : 15/607118
DATED : March 31, 2020
INVENTOR(S) : Zhu et al.

Page 1 of 1

It is certified that error appears in the above-identified patent and that said Letters Patent is hereby corrected as shown below:

In the Claims

Column 10, Claim 8, Line 60, please delete "plurality of".

Column 10, Claim 8, Line 66, please delete "plurality of".

Signed and Sealed this
Twenty-first Day of July, 2020

Andrei Iancu
*Director of the United States Patent and Trademark Office*